Figure 1:
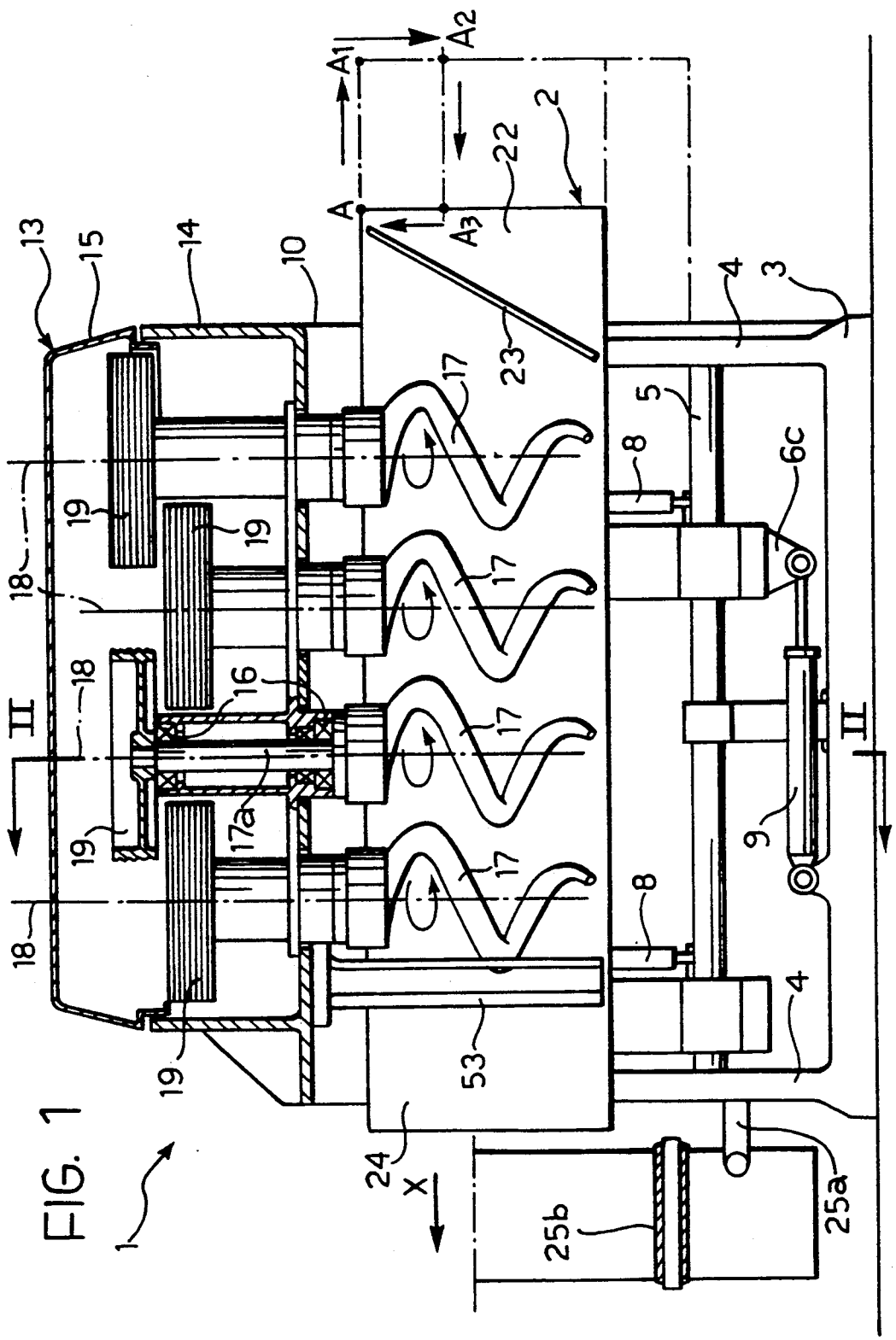

United States Patent [19]

Drocco

[11] Patent Number: 5,312,183
[45] Date of Patent: May 17, 1994

[54] KNEADING MACHINE FOR FOOD PRODUCTS AND A METHOD OF KNEADING WHICH CAN BE PERFORMED BY THE MACHINE

[75] Inventor: Amabile Drocco, Alba, Italy
[73] Assignee: Sancassiano SpA, Italy
[21] Appl. No.: 732,560
[22] Filed: Jul. 19, 1991

[30] Foreign Application Priority Data

Jul. 30, 1990 [IT] Italy .................. 67608 A/90

[51] Int. Cl.⁵ ........................................ B01F 7/00
[52] U.S. Cl. ..................... 366/97; 366/224; 366/219; 366/240; 366/297
[58] Field of Search ............. 366/240, 224, 208, 219, 366/66, 69, 97, 318, 240, 160, 92, 100; 99/348

[56] References Cited

U.S. PATENT DOCUMENTS

| | | | |
|---|---|---|---|
| 1,366,646 | 1/1921 | Glaze | 366/222 |
| 2,000,645 | 5/1935 | Rector | 366/203 |
| 2,164,044 | 6/1939 | Steinert | 366/240 |
| 3,176,966 | 4/1965 | Rietz et al. | 366/97 |
| 3,749,373 | 7/1973 | Kemper | 366/92 |
| 4,208,135 | 6/1980 | Bastiao | 366/219 |
| 4,836,685 | 6/1989 | Verreault | 366/160 |
| 4,919,539 | 4/1990 | Drocco | 366/224 |
| 5,000,578 | 3/1991 | Artin et al. | 366/100 |

FOREIGN PATENT DOCUMENTS

| | | |
|---|---|---|
| 248237 | 6/1912 | Fed. Rep. of Germany . |
| 5682 | 12/1913 | Fed. Rep. of Germany . |
| 1010471 | 6/1957 | Fed. Rep. of Germany . |
| 968181 | 1/1958 | Fed. Rep. of Germany . |
| 2240035 | 2/1974 | Fed. Rep. of Germany . |
| 2421089 | 11/1975 | Fed. Rep. of Germany . |
| 361260 | 5/1962 | Switzerland . |
| 1244115 | 8/1971 | United Kingdom . |

*Primary Examiner*—Philip R. Coe
*Assistant Examiner*—Patrick F. Brinson
*Attorney, Agent, or Firm*—Robbins, Berliner & Carson

[57] ABSTRACT

A continuously-operating kneading machine for food products includes a channel-shaped element along which the mixture is advanced and a plurality of kneading tools disposed in the channel-shaped element so that the product advancing along the channel-shaped element encounters them in succession. The kneading tools are rotatable about axes substantially transverse the direction of advance of product along the channel-shaped element.

14 Claims, 5 Drawing Sheets

KNEADING MACHINE FOR FOOD PRODUCTS AND A METHOD OF KNEADING WHICH CAN BE PERFORMED BY THE MACHINE

DESCRIPTION

The present invention relates to kneading machines for food products, of the type comprising:
a container for the product to be kneaded,
a kneading tool rotatable in the container, and
drive means for rotating the kneading tool.

According to a first conventional technique, a kneading machine of the type indicated includes a container in the form of a rotary bowl in which the ingredients of the mixture are placed and which then brings the various portions of the mixture up to the kneading tool during kneading. Machines of this type have kneading tools of various configurations. A particularly advantageous version is a so-called "helical" machine, that is, a machine with a helical kneading tool constituted by a bar with a circular cross-section arranged helicoidaly around a theoretic ideal cylinder. These machines produce very goods results from the point of view of the quality of the mixture, they perform the kneading cycle fairly quickly, and they can be used to work on different mixtures, their operating characteristics being adapted from time to time to the type of mixture being kneaded.

Machines with rotary bowls have the disadvantage, however, that their operating cycles are discontinuous. In other words, each kneading cycle includes the loading of the bowl with the ingredients of the mixture and finishes with the discharge of the mixture produced from the bowl. Only after the discharge stage is complete can the bowl be refilled with the ingredients necessary to make a fresh mixture. Moreover, for large-scale commercial production, kneading bowls of ever-increasing size tend to be used in order to produce the largest possible batch of mixture in each kneading cycle. At the end of the kneading cycle, the mixture is discharged from the bowl and sent to the user machines, for example, a chopping machine or a moulding machine. In the case of a mixture containing yeast, the first portion of mixture discharged from the bowl will reach the user machine considerably in advance of the last portion of the mixture, and this results in a different rising time and, eventually, to non-uniform characteristics of the final product.

Naturally, this disadvantage could be avoided by the use of kneading machines which can work continuously. In fact, another conventional technique uses a continuous-flow kneading machine which comprises, essentially, a tubular element containing an Archimedean screw shaft or the like which advances the product along the tubular element and at the same time forms the mixture. Continuous-flow kneading machines produced up to now have the disadvantage, however, that they do not ensure that the proportion of the ingredients is uniform in each small portion of the elongate mass of mixture output from the machine. In other words, it is difficult with these machines to ensure that the quantities of the ingredients in each portion correspond precisely to the desired predetermined weights because a mixture of ingredients measured out continuously is less homogeneous. This leads to difficulties and loss of time in setting up the machine each time the quantities of the ingredients of the mixture are changed to produce a product according to a different recipe. Moreover, known kneading machines of the continuous-flow type cannot produce a mixture of a quality comparable to that which can be produced by a machine with a rotary bowl, particularly a helical machine.

The primary object of the present invention is to provide a kneading machine which can work continuously but which nevertheless produces a mixture of a quality comparable to that which can be produced by a kneading machine with a rotary bowl.

A further, particular object of the invention is to provide a continuous-flow kneading machine which can achieve a kneading action exactly like that of a helical machine.

A further object of the invention is to provide a kneading machine which can work continuously but which nevertheless ensures that the proportion of ingredients is completely uniform throughout elongate mass of mixture output by the machine.

In order to achieve these objects, the subject of the present invention is a kneading machine for food products having the features indicated in the annexed claim 1.

In the present description and in the claims which follow, the term "channel-shaped element" is used to indicate an element of any shape which can support and guide the mixture as it moves from an input end to an output end of the machine. For example, this expression would include a duct-like element with a closed, for example, circular, cross-section.

In a preferred embodiment, the kneading tools are of the helical type.

These characteristics provide a kneading machine which can work continuously but which nevertheless produces a mixture of a quality comparable to that which can be produced by a kneading machine with a rotary bowl. From a certain point of view, the machine according to the invention and, in particular, the embodiment of the invention which provides for the use of helical tools could be said to correspond to a helical machine with continuous operation. It thus retains all the advantageous characteristics of helical machines of known type but has the additional advantage of continuous operation.

According to a further characteristic, the machine according to the invention includes supply means upstream of the input end of the channel-shaped element for supplying, in succession, a plurality of batches of mixed product composed of precisely weighed quantities of predetermined ingredients. In this context, mixed products means a mixture of various ingredients constituting a mass of uniform composition which has not yet reached the actual kneading stage, during which the formation of the gluten takes place, and which is carried out in the channel-shaped element. By virtue of the aforesaid characteristic, the elongate mass of mixture output from the machine has uniform proportions of ingredients and the machine can be set up quickly and easily to produce a mixture according to a different recipe. The details of one possible embodiment of the means for supplying successive mixed batches will be given below with reference to the appended drawings.

Another characteristic of the preferred embodiment of the invention lies in the fact that the channel-shaped element can perform a cyclic movement including a first stage of horizontal movement against the flow of the products, a second descending stage, a third stage—subsequent to or simultaneous with the second stage—of horizontal movement with the flow of the product, and a fourth stage in which it ascends again. When the channel-shaped element is in its raised position, the product therein is engaged by the kneading tools and hence does not follow the backward movement of the channel-shaped element during the first stage of its cycle. During this first stage, therefore, the mixture in the channel-shaped element is moved forwards relative thereto. During the second and third stages, when the channel-shaped element is lowered, the mixture follows it by gravity and is freed from the kneading tools so that, during this stage, the mixture moves with the channel-shaped element until it comes into engagement with the kneading tools again as the channel-shaped element returns to its raised, forward starting position. A sequence of such cycles of movement thus makes the mixture advance along the channel-shaped element. Naturally, a movement of the desired type and, in particular, the desired speed of advance of the mixture in the channel-shaped element, can be achieved by the adjustment of the characteristics of the cycle and the speed of rotation of the kneading tools. The movements of the channel-shaped element can be influenced directly, in particular, by the adjustment of the speed with which the movements take place, the sizes of the movements and their directions until the best combination of adjustments is achieved. The time for which the mixture remains in the channel-shaped element in which the tools perform their kneading action can thus be varied to produce more or less developed mixtures; in fact, the ingredients of mixtures for different products have to be kneaded differently.

Once the optimum adjustment of the machine has been defined for a certain mixture, that adjustment can be stored in a computer (for example, a PLC programmer) and the predetermined working cycle will then be carried out automatically whenever that type of mixture is to be produced.

It is clear that the machine of the present invention has a high degree of versatility and can be adapted to operate with any kind of mixture without the need for time to set it up in order to change from the kneading of one product to a different product, once the various adjustments have been stored.

Naturally, even if the channel-shaped element remains in a fixed position, the product advances through it simply because the products which encounters a kneading tool tends to be advanced thereby towards the next kneading tool.

Further characteristics and advantages of the machine according to the invention will become clear from the description which follows with reference to the appended drawings.

According to a further aspect, the continuous-flow kneading process, particularly for food products, performed by the machine according to the invention is also a subject of the present invention.

In particular, a subject of the invention is a method of kneading a continuous flow of food products, characterised in that it includes the following steps:
providing a channel-shaped element,
providing two mixing units,
supplying each mixing unit with precisely weighed quantities of predetermined ingredients,
preparing a succession of batches of mixed product by means of the aforesaid mixing units,
supplying the batches output of the two mixing units alternately to the input end of the channel-shaped element so as to produce a substantially continuous, elongate mass of product,
advancing the elongate mass thus supplied to the channel-shaped element towards its output end, and
kneading the elongate mass as it advances through the channel-shaped element by means of a plurality of tools disposed in the channel-shaped element and rotatable about axes substantially transverse the length of the channel-shaped element so that the elongate mass advancing along the channel-shaped element encounters them in succession.

Figure 2:
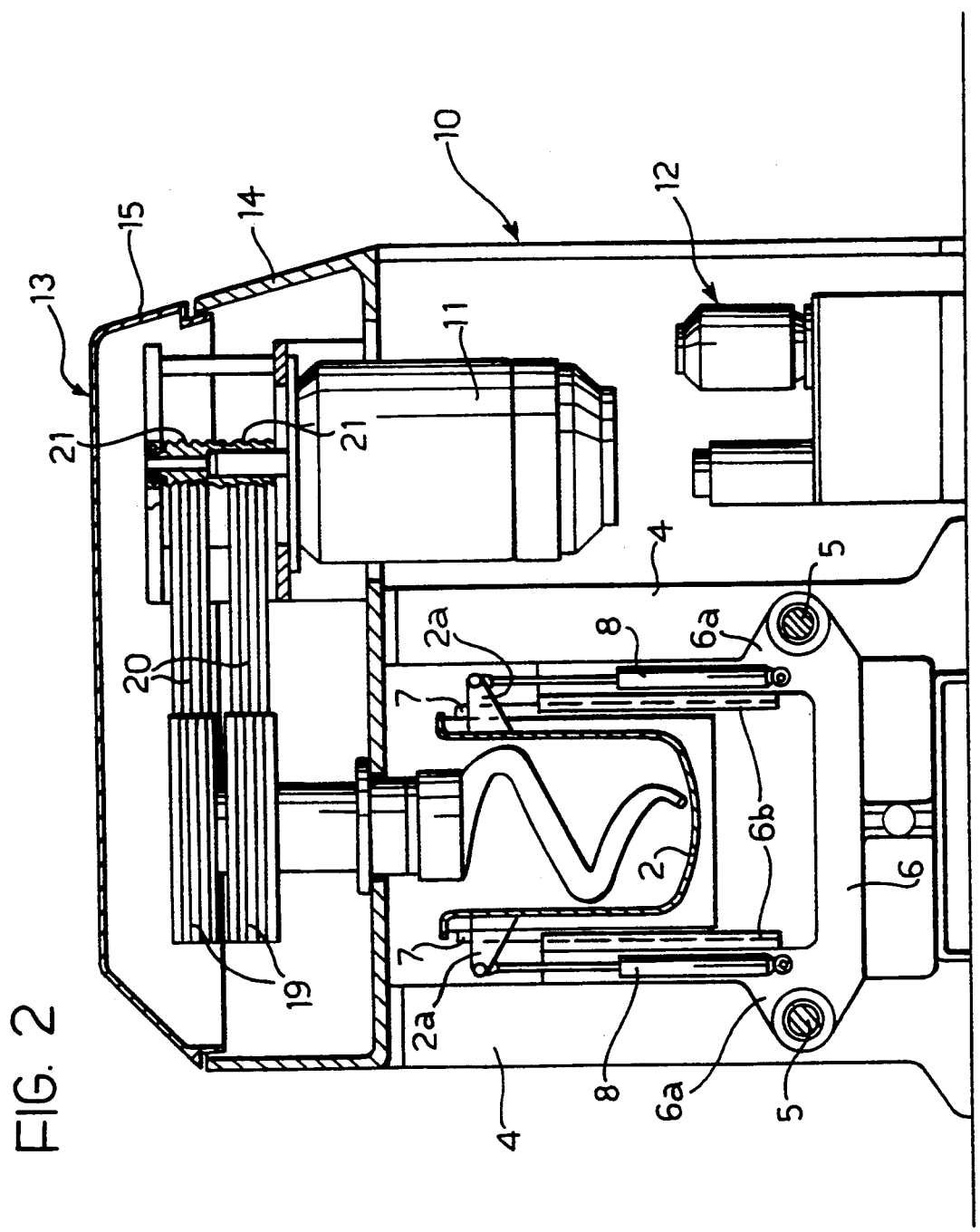
Figure 3:
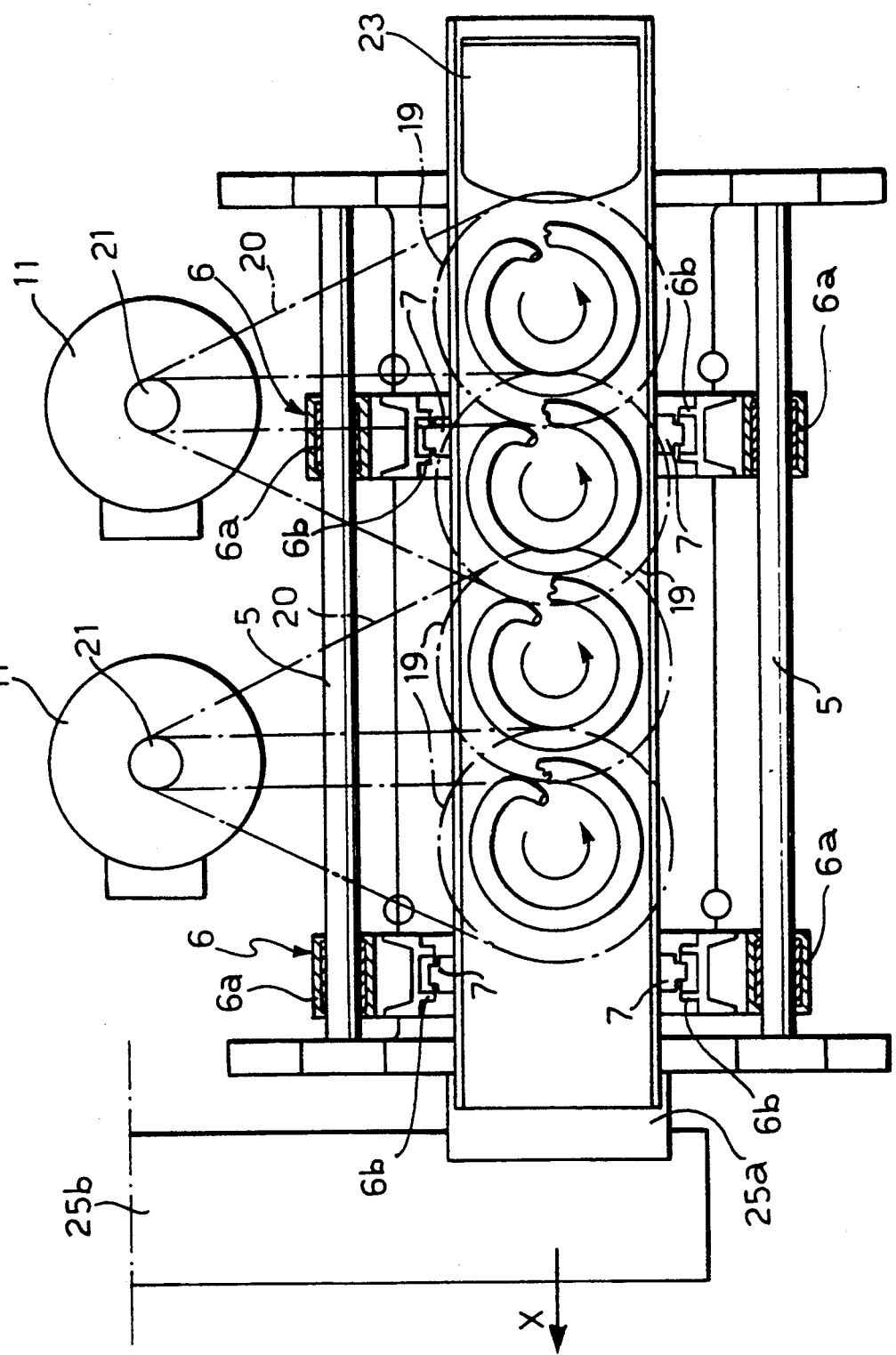
Figure 4:
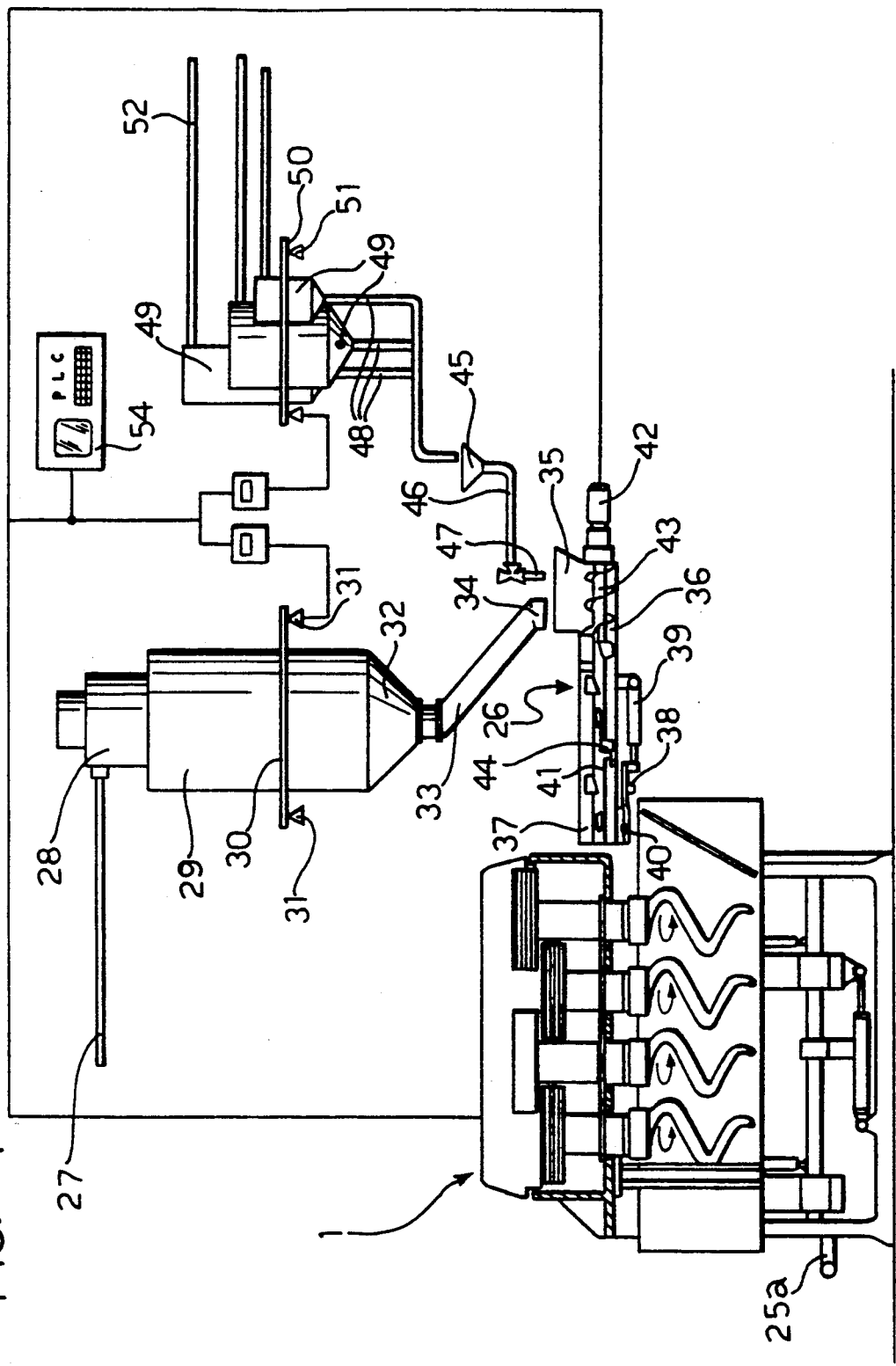
Figure 5:
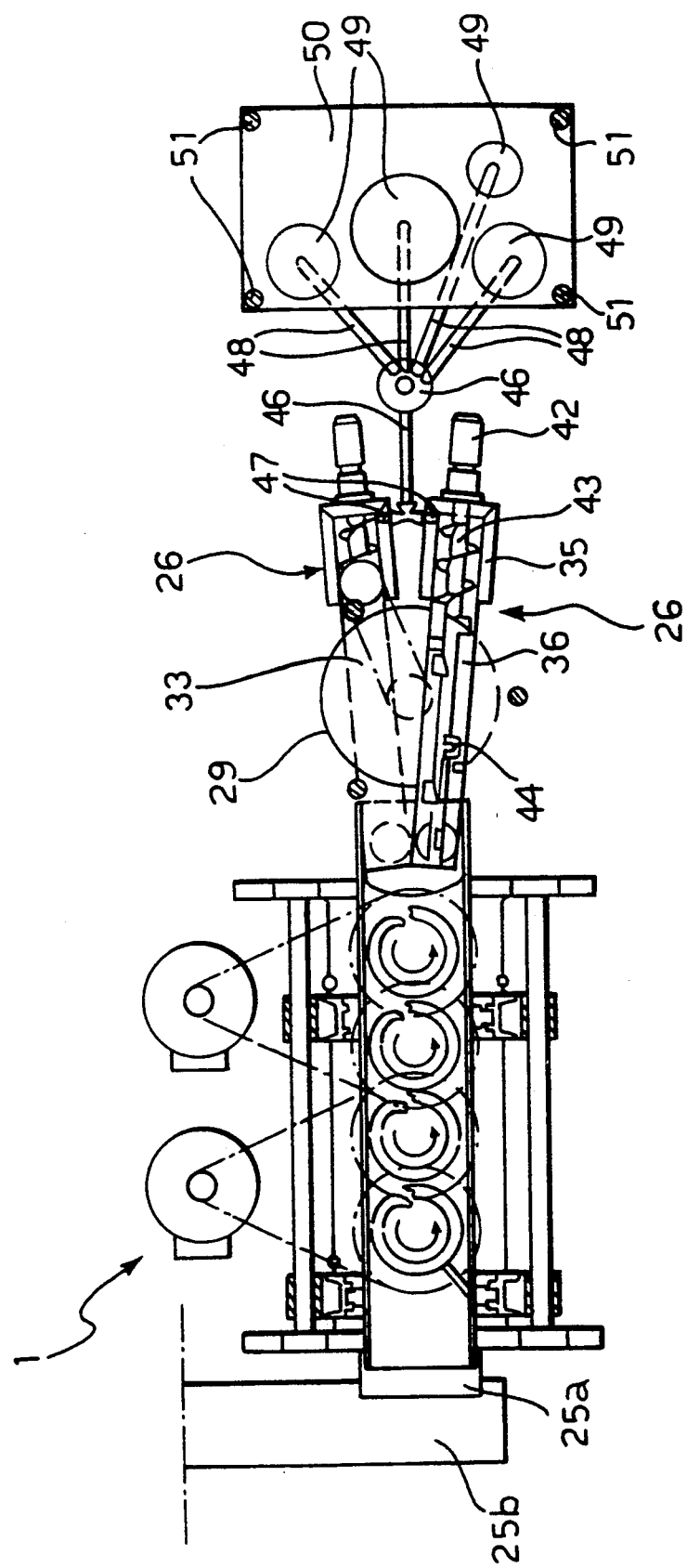

The invention will now be described with reference to the appended drawings, in which:

FIG. 1 is a partially-sectioned elevational view of a kneading machine according to the invention, FIG. 2 is a section taken on the line II—II of FIG. 1, FIG. 3 is a plan view of the machine of FIGS. 1 and 2, FIG. 4 is a schematic view of a complete operating system including the machine according to the invention, and FIG. 5 is a plan view of the system of FIG. 4.

In the drawings, a continuous-flow kneading machine for food products is generally indicated 1. The machine 1 includes a stainless-steel channel-shaped element 2 for containing the flow of product worked by the machine. The channel-shaped element 2 is mounted on a fixed base structure 3 including four pillars 4 to which the ends of two cylindrical guide bars 5 are fixed, the axes of the guide bars 5 being contained in a horizontal plane and being parallel to the length of the channel-shaped element 2. A frame 6 for supporting the channel-shaped element is slidable on the cylindrical guide bars 5. The frame 6 includes four appendages 6a incorporating bushes which are slidable in pairs on the cylindrical guide bars 5 with the interposition of plain bearings. The support frame 6 has four vertical guides 6b in which corresponding guide blocks 7 carried externally by the structure of the channel-shaped element 2 are slidable vertically.

Two pairs of fluid jacks, indicated 8, are interposed between the support frame 6 and external lugs 2a (FIG. 2) on the two sides of the channel-shaped element for moving the channel-shaped element 2 vertically relative to the support frame 6 between a raised position and a lowered position. A further fluid jack, indicated 9, is interposed between the base structure 3 and a lug 6c on the bottom of the support frame 6 for moving the support frame 6 horizontally relative to the base structure 3 between a forward position (with reference to the direction of advance of the product in the channel-shaped element, which is indicated by the arrow X) and a rearward position.

The fixed structure 3 of the machine also includes an upright 10 enclosing two electric drive motors 11, whose function will be explained below, and a hydraulic control unit 12 for controlling the supply of pressurised fluid to the jacks 8, 9. The fixed structure of the machine also includes a head 13 which comprises a body 14 with a cover 15 and is fixed to the upright 10 and to the pillars 4. The base wall of the head 14 supports a plurality (four in the embodiment illustrated) of helical kneading tools 17 for rotation by means of rolling bearings 16 (FIG. 1). The tools 17 are supported for rotation about vertical axes 18 and are arranged in series in the channel-shaped element 2 with their axes 18 intersecting the central longitudinal axis of the element 2. Each tool 17 has a shaft 17a which is supported for rotation by the head 13 by means of the bearings 16. The upper end of each shaft 17a is connected to a pulley 19. The four pulleys 19 are arranged in pairs at different heights to prevent interference between them. A driving pulley 21 is keyed to the output shaft of each motor 11 and transmits the drive, through two belt units 20, to two adjacent pulleys 19 positioned at different heights so that each of the two motors 11 can rotate two kneading tools 17 simultaneously by means of the belt transmission described above.

In the preferred embodiment illustrated in the drawings, the cylindrical envelopes of the four kneading tools 17 are substantially in contact with each other in sequence. The cylindrical envelope is an imaginary space surrounding each kneading tool 17 when each kneading tool 17 is rotated. It should be noted that the two side walls of the channel-shaped element 2 are substantially in contact with the cylindrical envelope of kneading tool 17 to enable optimum kneading. The channel-shaped element has an input end 22 with a chute 23 for admitting the product to be kneaded and an output end 24 for discharging the mixture produced. In the embodiment illustrated, the chute 23 is fixed to the channel-shaped element. A structure for supporting the chute 23 may be fixed to the base structure 3, however, so that the chute remains in a fixed position during the movements of the channel-shaped element which will be described in detail below.

The elongate mass of mixture discharged from the output end 24 is deposited on a first conveyor belt 25a which deposits it on a second conveyor belt 25b or on any other conveyor means which carry the mixture to the user machines.

With reference to FIGS. 4 and 5, two mixing units 26 are provided upstream of the input end 22 of the channel-shaped element 2 and each is intended cyclically to receive precisely weighed quantities of predetermined ingredients so as to form a preliminary mixture of the ingredients for delivery, in alternation with the other mixing unit, to the input end 22 of the channel-shaped element 2 of the kneading machine.

In FIGS. 4 and 5, a pneumatic line for transporting powdery ingredients (for example, flour, sugar, etc.), is indicated 27. This line brings the ingredients to a settling cyclone 28 of known type from which the powdery ingredients go to a tank 29. The tank 29 is mounted on a platform balance 30 of known type which bears on load cells 31 for precisely weighing the quantity of powdery ingredients therein. When the weight of the ingredients supplied reaches a preset value, the pneumatic transportation of further ingredients is stopped and the contents of the tank 29 are discharged into a hopper 32 and thence into an orientable arm 33 whose outlet 34 can be led selectively to a load hopper 35 of one mixing unit 26 or the other.

The structural details of the parts described above are not given since they are of known type and do not fall within the scope of the present invention. Moreover, the elimination of these details from the drawings makes the latter more readily and easily understood. Also according to a known technique, the signals output by the load cells 31 are sent to a microprocessor 54 which controls the process according to a predetermined program.

Each mixing unit 26 includes a tank 36 which receives the weighed ingredients from the feed hopper 35 and has an outlet 37 which is closed at its end but has a gate 38 underneath movable by a fluid jack 39 between a retracted position in which it opens an outlet 40 and a forward closure position. A shaft 41 rotatable in the tank 36 is driven by a geared drive unit 42 and has a first screw portion 43 and a second portion which has a series of blades 44 arranged in a helix.

A header for the liquid ingredients (for example, water, oil, a water-yeast mixture, salt solution). indicated 45, is connected by means of a tube 46 to an on-off valve with two outlets 47 for selectively supplying liquid ingredients to the load hopper 35 of one or other of the mixing units 26. The liquid ingredients are discharged into the header 45 by a plurality of tubes 48 from respective reservoirs 49. A further platform balance 50 is associated with the reservoirs 49 and has load cells 51 which weigh precisely the quantities of liquid supplied to the reservoirs 49 by supply lines 52. The load cells 51 are also connected to the electronic system which controls the process automatically.

The machine described above operates as follows.

Each mixing unit 26 is supplied with precisely weighed quantities of predetermined ingredients. The powdery ingredients reach the mixing units 26 through the line 27 and the elements 28-34 described above. The liquid ingredients reach the mixing units 26 through the lines 52 and the elements 47-51 described above. The orientable arm 33 and the two outlet connectors 47 are controlled so as to supply the mixing units alternately. Once one of the mixing units has received the precisely weighed quantities of the necessary ingredients, it is activated so as to carry out a preliminary mixing of the ingredients. This is achieved by the operation of the geared motor unit 42 which rotates the shaft 41. The shaft forces the product to advance along the tank 36 and at the same time effects the mixing action. The shaft 41 can rotate in both senses so as to move the ingredients back and forth in the tank 36 one more times until the desired degree of homogeneity is achieved Whilst one of the two mixing units 26 is working, the other mixing unit is supplied with the quantities necessary to make a second batch of mixed product. When a particular unit 26 completes its mixing, the cylinder 39 opens the outlets 40 so that the mixed product falls onto the chute 23 (FIG. 1) at the input end 22 of the channel-shaped element 2 at a rate proportional to the quantity of mixture required by the kneading machine per hour at its operating speed. The two mixing units 26 operate alternately so that the input end 22 of the channel-shaped element 2 receives a continuous succession of batches of mixed product, each batch being constituted by precisely weighed quantities of predetermined ingredients.

When the supply of the mixed product to the input end 22 begins, the electric motors 11 start to rotate the four helical kneading tools 17 by means of the pulleys 21, the belts 20, the pulleys 19 and the shafts 17a. If the channel-shaped element 2 is assumed to remain in a static position, the rotary movements of the kneading tools 17 will, in any case, advance the product along the channel-shaped element 2. In fact, as soon as the product supplied at the end 22 encounters the first kneading tool 17, the tool starts to knead and at the same time urges the products towards the next kneading tool. The product thus advances along the channel-shaped element 2 from one kneading tool to another until it arrives at the output end 24. A fixed blade 53 projects downwardly from the head 13 at this end and is incident on the cylindrical envelope of the last kneading tool 17 to facilitate the detachment of the kneaded product from the last tool.

The kneading tools 17 rotate anticlockwise, as indicated by the arrows in the drawings (with reference to FIG. 3) but each tool has the shape of a helix extending clockwise from its upper end to its lower end.

For better control over the progress of the product through the channel-shaped element 2 and in order to achieve the desired degree of kneading, the channel-shaped element 2 is moved by the operation of the fluid jacks 8, 9 so that the channel-shaped element performs a cyclic movement. More precisely, with reference to FIG. 1, the cyclic movement includes a first stage in which the channel-shaped element 2 is in its raised position and moves horizontally from its forward position towards its rearward position (along the path A--A1 in FIG. 1), a second stage in which the channel-shaped element moves from its raised position to its lowered position (path A1-A2), a third stage in which the channel-shaped element remains in its lowered position and moves from its rearward position to its forward position (path A2-A3), and a fourth stage in which the channel-shaped element moves from its lowered position to its raised position so as to return to its original position (path A3-A). the second and third stages may be simultaneous so that the channel-shaped element moves from its rearward position to its forward position (path A1-A3) as it descends. Similarly, the third and fourth stages may be executed simultaneously (path A2-A).

During the first stage (A-A1), the channel-shaped element 2 is in its raised position and the product in the bottom of the channel-shaped element thus encounters the kneading tools 17 which carry out the kneading. With reference to FIG. 2, it should be noted that the two side walls of the channel-shaped element 2 are substantially in contact with the cylindrical envelope of kneading tool 17 to enable optimum kneading. During the first stage, the channel-shaped element remains in its raised position and moves from its forward position (shown in continuous outline in FIG. 1) to a rearward position.

During this movement, the product supported by the channel-shaped element remains in contact with the kneading tools 17 and the channel-shaped element therefore slides beneath it so that the product actually advances relative to the channel-shaped element. When the channel-shaped element is moved from its raised position to its lowered position to reach the position A3, the product which is supported by the channel-shaped element follows it by gravity and as a result of the downward thrust caused by the rotation of the helices which are "unscrewed" from the mixture, and is thus freed from the kneading tools 17.

During this stage, therefore, the product moves with the channel-shaped element 2. Finally, when the channel-shaped element 2 returns to its raised position A, the kneading tools engage the product again and continue the kneading action but, in the meantime, as has already been seen, the product has moved relative to the channel-shaped element by a step equal to the distance A-A1. The progress of the product through the channel-shaped element is thus facilitated by its cyclic movement. Naturally, the progress of the product can be influenced, and hence controlled, by variations in the characteristics of the cyclic movement of the channel-shaped element, or even by the variation of the speed of rotation of the kneading tools 17.

When the product reaches the last kneading tool 17 it is detached by the blade 53 and is deposited on the conveyor 25a which sends it to the conveyor 25b and thence to the user machines. A continuous elongate mass of mixture is thus deposited on the conveyor 25a.

It is clear from the foregoing description that, on the one hand, the machine according to the invention produces a continuous flow of a kneaded product of uniform quality. On the other hand, the characteristics of the mixture are the best which can be achieved by kneading with a helical tool. The quantities of the ingredients in the elongate mass of mixture produced are rigorously uniform since the elongate mass is produced from a plurality of small batches supplied continuously to the channel-shaped element 2 in succession by the mixing units 26, each batch being constituted by precisely weighed quantities of the necessary ingredients. Tests carried out have shown that the kneading machine according to the present invention ensures that the mixture is of a constant quality whether it is operating with the kneading tools completely immersed in the flow of mixture or with about a sixth of the height of the tools immersed when the channel-shaped element is raised.

The potential productivity of the machine may therefore vary within the aforesaid extreme limits for the height of the flow of mixture so that it can adapt to the precise quantity of mixture required by the final user machines. The hourly production of mixture is determined by the quantity of mixed product supplied to the channel-shaped element 2 by the mixing units 26.

Naturally, the principle of the invention remaining the same, the details of construction and forms of embodiment may be varied widely with respect to those described and illustrated purely by way of non-limiting example.

For example, the structure and shape of the channel-shaped element and of the means used for causing its cyclic movement may be varied widely with respect to those described purely by way of example. For example, a curved channel could be used with tools rotatable about axes which are not vertical but are nevertheless arranged transverse the channel. Although the use of helical kneading tools is preferred, the use of kneading tools of different configurations is not excluded. Naturally, the number of kneading tools may also be different from that described. Finally, the means for supplying the succession of precisely metered batches to the input end 22 of the channel-shaped element 2 may also differ from those described purely by way of example, with reference to FIGS. 4 and 5. For example, one could employ two helical kneading machines for discharging the premixed batches into a common hopper for feeding a continuous elongate mass to the channel-shaped element 2.

I claim:

1. A kneading machine for forming a continuous elongated mass of a mixture of food products, particularly of dough, comprising:

a container for the product to be kneaded, constituted by a horizontal channel-shaped element along which the mixture being formed is advanced and which has an input end for admitting the product to be kneaded and an output end for discharging the mixture produced;

a plurality of helical kneading tools arranged in the channel-shaped element so that the product advancing along the channel-shaped element encounters them in succession, each helical kneading tool having a cylindrical envelope with a vertical axis which intersects orthogonally a central axis of a duct defined by the channel-shaped element, the cylindrical envelopes of the respective kneading tools being in contact with each other and with the walls of the channel-shaped element;

drive means for rotating each helical kneading tool around its vertical axis; and auxiliary drive means for imparting a cyclic movement to said channel-shaped element relative to the kneading tools, while keeping said channel-shaped element horizontal, said cyclic movement including a first stage of horizontal movement against the flow of the product, a second descending stage, a third stage of horizontal movement with the flow of the product, and a fourth stage in which it ascends again.

2. A machine according to claim 1, wherein the central axis is straight.

3. A machine according to claim 1, wherein the central axis is curved.

4. A machine according to claim 1, wherein a fixed blade is supported within the channel-shaped element and is substantially incident on the cylindrical envelope of the last kneading tool so that the product encounters it.

5. A machine according to claim 1, wherein the drive means comprise motor means and a mechanical transmission interposed between the motor means and the kneading tools, the motor means being controllable in order to vary the speed of rotation of the kneading tools.

6. A machine according to claim 1, including adjustable means for moving the channel-shaped element.

7. A machine according to claim 6, wherein the channel-shaped element is movable vertically on a support frame which in turn is slidable axially on fixed guide elements, the means for moving the channel-shaped element including at least one first actuator interposed between a fixed base structure and the support frame for moving the frame horizontally and at least one second actuator interposed between the support frame and the channel-shaped element for moving the latter vertically.

8. A machine according to claim 7, wherein the motor means and the means for moving the channel-shaped element are controlled by a P.L.C. which coordinates the variable functions of the machine by means of pre-established programs relating to different types of mixture to be produced.

9. A machine according to claim 1, including supply means upstream of the loading end of the channel-shaped element for supplying in succession a plurality of batches of mixed product composed of precisely weighed quantities of predetermined ingredients.

10. A machine according to claim 9, wherein the supply means include two mixing units, each of which receives in cycles precisely weighed quantities of predetermined ingredients to be mixed, produces a preliminary mixture of the ingredients, and supplies it to the input end of the channel-shaped element of the kneading machine in alternation with the other mixing unit.

11. A machine according to claim 10, including measuring means for supplying the supply means with predetermined weights of powdery substances and liquids, the measuring means communicating with discharge means for discharging the weighed quantities selectively into one or other of the mixing units.

12. A machine according to claim 10, including measuring means for supplying the supply means with predetermined weights of powdery substances and liquids, the measuring means communicating with discharge means for discharging the weighted quantities selectively into one or other of the mixing units.

13. A machine according to claim 1, wherein the third stage is executed subsequent to the second stage.

14. The machine according to claim 1, wherein the second stage and the third stage are executed simultaneously.

* * * * *